(12) United States Patent  
Williams (10) Patent No.: US 6,557,680 B2
(45) Date of Patent: May 6, 2003

(54) ON-DEMAND TRANSFER CASE WITH INTEGRATED SPROCKET AND BI-DIRECTIONAL CLUTCH ASSEMBLY

(75) Inventor: Randolph C. Williams, Weedsport, NY (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 09/891,790

(22) Filed: Jun. 25, 2001

(65) Prior Publication Data

US 2002/0029948 A1 Mar. 14, 2002

Related U.S. Application Data

(63) Continuation-in-part of application No. 09/612,643, filed on Jul. 7, 2000, now abandoned.

(51) Int. Cl.$^7$ .................. F16D 41/02; F16D 15/00; F16D 27/00
(52) U.S. Cl. .................. 192/27; 180/247; 192/38; 192/40; 192/44; 192/84.6
(58) Field of Search .................. 192/27, 38, 40, 192/44, 45, 47, 84.6; 180/247

(56) References Cited

U.S. PATENT DOCUMENTS

| | | | | |
|---|---|---|---|---|
| 3,414,096 A | * | 12/1968 | Reed ..................... | 192/44 |
| 4,222,472 A | * | 9/1980 | Telford .................. | 192/44 |
| 4,499,980 A | * | 2/1985 | Kaminski et al. ....... | 192/35 |
| 4,874,056 A | | 10/1989 | Naito | |
| 5,363,938 A | | 11/1994 | Wilson et al. | |
| 5,407,024 A | | 4/1995 | Watson et al. | |
| 5,704,863 A | | 1/1998 | Zalewski et al. | |
| 5,924,510 A | | 7/1999 | Itoh et al. | |
| 5,951,428 A | | 9/1999 | Itoh et al. | |
| 5,992,592 A | * | 11/1999 | Showalter ............... | 192/47 |
| 5,993,592 A | | 11/1999 | Perego | |
| 6,092,635 A | | 7/2000 | McCarthy et al. | |
| 6,123,183 A | | 9/2000 | Ito et al. | |
| 6,132,332 A | | 10/2000 | Yasui | |
| 6,149,543 A | * | 11/2000 | Breen ..................... | 192/12 R |
| 6,358,177 B1 | * | 3/2002 | Bowen et al. ........... | 475/174 |
| 6,409,001 B1 | * | 6/2002 | Kerr ....................... | 192/44 |

FOREIGN PATENT DOCUMENTS

WO  WO 99/28645 A1  *  6/1999

* cited by examiner

Primary Examiner—Rodney H. Bonck
(74) Attorney, Agent, or Firm—Harness, Dickey & Pierce P.L.C.

(57) ABSTRACT

A controllable, multi-mode, bi-directional overrunning clutch assembly and a shift system adapted for transferring drive torque from a primary shaft to a secondary shaft. The clutch assembly includes a first ring journalled on a first rotary member, a second ring fixed to a second rotary member, and a plurality of rollers disposed in opposed cam tracks formed between the first and second rotary members. The first ring is split to define an actuation channel between its end segments. A first spring-biased pin is moveable between positions engaged with and released from one end segment of the split first ring. A second spring-biased pin is moveable between positions engaged with and released from the opposite end segment of the split first ring. A moveable pin actuator controls movement of the first and second pins for establishing distinct operational modes.

17 Claims, 8 Drawing Sheets

ON-DEMAND TRANSFER CASE WITH INTEGRATED SPROCKET AND BI-DIRECTIONAL CLUTCH ASSEMBLY

CROSS-REFERENCE TO RELATED APPLICATIONS

This application is a continuation-in-part of U.S. Ser. No. 09/612,643 filed Jul. 7, 2000, and now abandoned, entitled "Power Transfer Assembly Equipped With A Bi-Directional Controllable Clutch".

FIELD OF THE INVENTION

The present invention relates generally to bi-directional overrunning clutch assemblies and, more particularly, to an actively controlled, multi-mode, bi-directional overrunning clutch assembly used in a four-wheel drive transfer case.

BACKGROUND OF THE INVENTION

Four-wheel drive vehicles are in great demand since consumers desire the enhanced on-road and off-road traction control they provide. In many four-wheel drive vehicles, a transfer case is installed in the drivetrain and is normally operable to deliver drive torque to the primary driveline for establishing a two-wheel drive mode. The transfer case is further equipped with a clutch assembly that can be selectively or automatically actuated to transfer drive torque to the secondary driveline for establishing a four-wheel drive mode. These "mode" clutch assemblies can range from a simple dog clutch that is operable for mechanically shifting between the two-wheel drive mode and a "locked" (i.e., part-time) four-wheel drive mode to a sophisticated automatically-actuated multi-plate clutch for providing an "on-demand" four-wheel drive mode.

On-demand four-wheel drive systems are able to provide enhanced traction and stability control and improved operator convenience since the drive torque is transferred to the secondary driveline automatically in response to lost traction of the primary driveline. An example of passively-controlled on-demand transfer case is shown in U.S. Pat. No. 5,704,863 where the amount of drive torque transferred through a pump-actuated clutch pack is regulated as a function of the interaxle speed differential. In contrast, actively-controlled on-demand transfer cases include a clutch actuator that is adaptively controlled by an electronic control unit in response to instantaneous vehicular operating characteristics detected by a plurality of vehicle sensors. U.S. Pat. Nos. 4,874,056, 5,363,938 and 5,407,024 disclose various examples of adaptive on-demand four-wheel drive systems.

Due to the cost and complexity associated with such actively-controlled on-demand clutch control systems, recent efforts have been directed to the use of overrunning clutches that can be controlled to provide various operating modes. For example, U.S. Pat. No. 5,993,592 illustrates a pawl-type controllable overrunning clutch assembly installed in a transfer case and which can be shifted between various drive modes. U.S. Pat. No. 6,092,635 discloses a hydraulically-actuated multi-function controllable overrunning clutch assembly noted to be operable in vehicular power transmission mechanisms. Likewise, U.S. Pat. Nos. 5,924,510, 5,951,428, 6,123,183, and 6,132,332 each disclose a controllable multi-mode overrunning clutch installed in a transfer case that is actuated via an electromagnetic clutch. Accordingly, a need exists to continue development of controllable bi-directional overrunning clutch assemblies which provide improved structure, robust operation, and reduced packaging for use in on-demand transfer cases.

SUMMARY OF THE INVENTION

The present invention is directed to a controllable, multi-mode, bi-directional overrunning clutch assembly and a shift system adapted for use in a transfer case for transferring drive torque from a primary output shaft to a secondary output shaft so as to establish a four-wheel drive mode. The clutch assembly includes a first ring journalled on a first rotary member, a second ring fixed to a second rotary member, and a plurality of rollers disposed in opposed cam tracks formed between the first and second rotary members. The first ring is split to define an actuation channel between its end segments. A first spring-biased pin is moveable between positions engaged with and released from one end segment of the split first ring. A second spring-biased pin is moveable between positions engaged with and released from the opposite end segment of the split first ring. The shift system includes a moveable pin actuator which controls movement of the first and second pins for establishing four distinct operational modes; on-demand 4WD-forward mode; an on-demand 4WD-reverse mode; a part-time 4WD mode (both directions); and a 2WD mode (both directions).

The transfer case of the present invention also includes a two-speed gearset and a range sleeve that is moveable for establishing high and low-range drive connections. In such two-speed transfer cases, the shift system also functions to coordinate movement of the pin actuator and the range sleeve to establish various combinations of speed ranges and drive modes.

In accordance with one embodiment of the present invention, the first ring is journalled on the secondary output shaft and the second ring is fixed to a rotary compound of a transfer assembly driven by the primary output shaft. Thus, the invention provides for installing the controllable, multi-mode, bi-directional overrunning clutch in association with the front output shaft to permit significant axial length reductions for the transfer case.

Thus, it is an object of the present invention to provide an on-demand transfer case equipped with a controllable, multi-mode, bi-directional overrunning clutch that advances the state of the four-wheel drive technology.

It is a further object of the present invention to provide a power-operated actuator for controlling shifting of the clutch assembly between its distinct modes in response to various sensor signals received by a controller unit.

Further objects, advantages and features of the present invention will become readily apparent to those skilled in the art by studying the following description of the preferred embodiment in conjunction with the appended drawings which are intended to set forth the best mode currently contemplated for carrying out the present invention.

DETAILED DESCRIPTION OF THE PREFERRED EMBODIMENT

Figure 1:
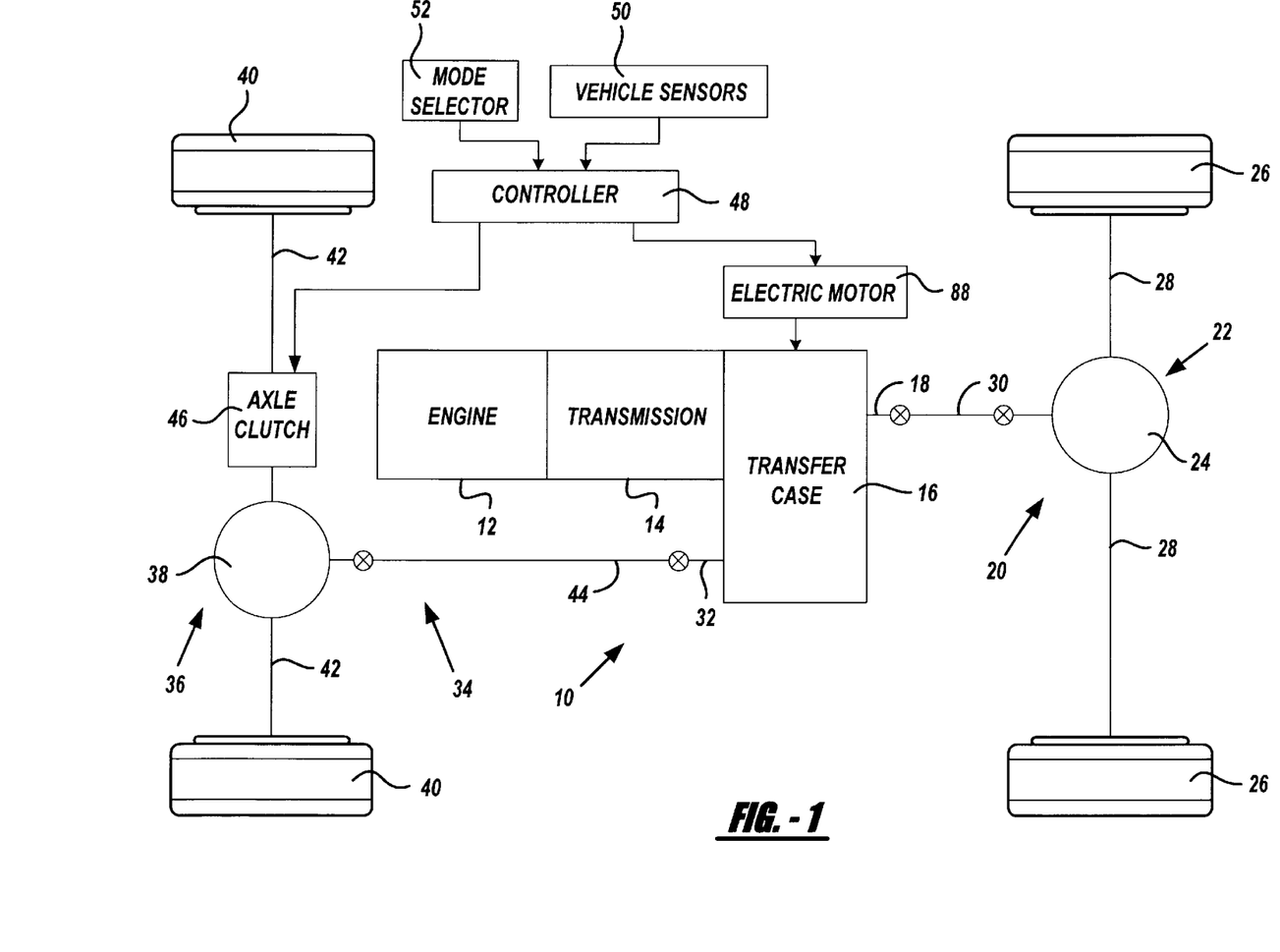
FIG. 1 is a schematic view of a four-wheel drive motor vehicle equipped with a transfer case constructed according to the present invention.

Referring now to FIG. 1, a drive system 10 for a four-wheel drive motor vehicle is shown to include a power source, such as engine 12, which drives a conventional transmission 14 of either the manually-shifted or automatic type. The output shaft of transmission 14 drives an input member of a transfer case 16 which, in turn, delivers drive torque to a primary output shaft 18 that is operably connected to a primary driveline 20. Primary driveline 20 includes an axle assembly 22 having a differential 24 driving a pair of wheel assemblies 26 via axleshafts 28, and a drive shaft 30 connected between primary output shaft 18 and differential 24.

Transfer case 16 further includes a secondary output shaft 32 that is operably connected to a secondary driveline 34. Secondary driveline 34 includes an axle assembly 36 having a differential 38 driving a pair of wheel assemblies 40 via axleshafts 42, and a driveshaft 44 connected between secondary output shaft 32 and differential 38. An axle disconnect clutch 46 is provided for selectively coupling axleshafts 42 to differential 38. When disconnect clutch 46 is released, secondary driveshaft 44 and secondary output shaft 32 are disconnected from the remainder of secondary driveline 34 and are not rotatably driven by rolling movement of wheels 40. Alternatively, locking hubs (not shown) may be used to selectively couple and uncouple wheels 40 from connection with axleshafts 42.

Drive system 10 also includes an electronic controller 48 which receives input data from various vehicle sensors 50 and a mode selector 52. Controller 48 includes various programs and subroutines which use the input data to generate control signals used to actuate one or more controllable systems associated with transfer case 16, which will be detailed hereinafter. According to the arrangement shown, primary driveline 20 is the rear driveline of a rear wheel drive vehicle while secondary driveline 34 is its front driveline. Drive torque is normally supplied to rear driveline 20 and is only transferred to front driveline 34 when mode selector 52 signals operation in one of an "on-demand" or a "part-time" four-wheel drive mode. However, it will be understood that the teachings of the present invention could easily be adapted for use in a front wheel drive vehicle in which the front driveline would be designated as the primary driveline.

Figure 2:
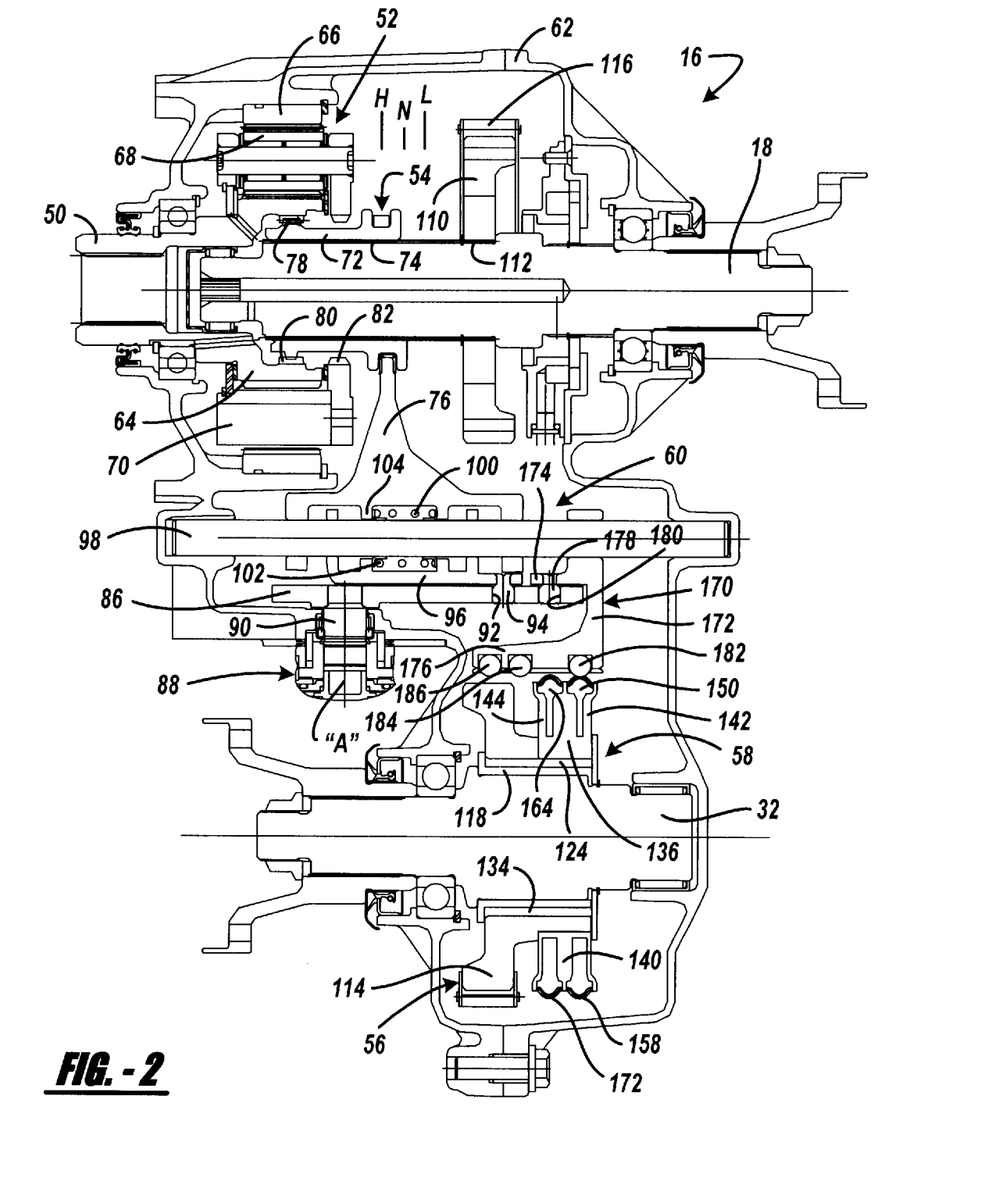
FIG. 2 is a sectional view of the transfer case equipped with a controllable, multi-mode, bi-directional overrunning clutch assembly and shift control system of the present invention.

Referring primarily to FIG. 2, transfer case 16 is shown to generally include an input shaft 50, rear output shaft 18, a planetary reduction gearset 52, a range clutch 54, front output shaft 32, a transfer assembly 56, a bi-directional clutch assembly 58, and a shift system 60, all of which are mounted with a housing assembly 62. Input shaft 50 is adapted for connection to the output shaft of transmission 14. Planetary gearset 52 includes a sun gear 64 fixed for rotation with input shaft 50, a ring gear 66 non-rotatably fixed to housing assembly 62, and a plurality of planet gears 68 rotatably supported on a planet carrier 70. Range clutch 54 includes a range collar 72 fixed via a splined connection 74 for rotation with and axial bi-directional movement on rear output shaft 18. Range collar 72 is moveable between a high-range (H) position, a neutral (N) position, and a low-range (L) position via axial translation of a range fork 76. In the H position, clutch teeth 78 on range collar 72 engage internal clutch teeth 80 on input shaft 50 so as to establish a direct ratio drive connection between input shaft 50 and rear output shaft 18. In the L position, clutch teeth 78 on range collar 72 engage internal clutch teeth 82 on planet carrier 70 so as to establish a reduction ratio drive connection such that rear output shaft 18 is driven at a reduced speed ratio relative to input shaft 18. In the N position, range collar 72 is disengaged from coupled engagement with both input shaft 78 and planet carrier 70 such that no drive torque is transmitted from input shaft 50 to rear output shaft 18.

The position of range collar 72 and range fork 76 are controlled by a sector plate 86 and an electric gearmotor/encoder assembly 88 that are associated with shift system 60. Sector plate 86 is rotated about on axis "A" by and output shaft 90 of motor assembly 88. Sector plate 86 has a contoured range slot 92 within which a follower pin 94 is retained. Follower pin 94 is fixed to a shift bracket 96 which is retained for sliding movement on a shift rail 98 that is fixed to housing assembly 62. Range fork 76 has a C-shaped end section retained in an annular groove formed in range collar 72. A biasing spring 100 surrounds shift rail 98 and its opposite ends engage laterally-spaced pairs of lugs 102 and 104 formed respectively on bracket 96 and range fork 76. The contour of range slot 92 is configured to axially translate bracket 96 in response to rotation of sector plate 86. Spring 100 functions as a resilient energy storage coupling between bracket 96 and range fork 76 that allows rapid and smooth engage of clutch teeth 78 on range collar 72 with the clutch teeth on one of input shaft 50 and planet carrier 70 after a "block out" condition has been eliminated to complete the selected range shift.

It will be appreciated that planetary reduction gearset 52, range collar 72, range fork 76 and its corresponding connection to sector plate 86, which function to provide a two-speed (i.e., high-range and low-range) capability to transfer case 16 are optional such that transfer case 16 could be functional as a one-speed direct drive unit. Moreover, the non-synchronized range shift system disclosed could alternatively be replaced with a synchronized range shift system to permit "on-the-move" shifting between high and low-range without the need to stop the vehicle. Commonly-owned U.S. Pat. Nos. 5,911,644, 5,957,429, and 6,056,666 disclose synchronized range shaft systems that are readily adapted for use with transfer case 16 and which are hereby incorporated by reference.

Transfer assembly 56 is driven by rear output shaft 18 and is shown to include a first sprocket 110 fixed via a splined connection 112 to rear output shaft 18, a second sprocket 114 rotatably mounted on front output shaft 32, and a power chain 116 meshed with both sprockets 110 and 114. Clutch assembly 58 is provided for selectively coupling second sprocket 114 to front output shaft 32 for transferring drive torque from rear output shaft 18 through transfer assembly 56 to front output shaft 32. Clutch assembly 58 is a controllable, multi-mode, bi-directional overrunning clutch installed between second sprocket 114 and front output shaft 32. Clutch assembly 58 includes an inner ring 118 having an inner surface 120 concentrically mounted on an outer surface 122 of front output shaft 32, and an outer ring 124 formed as an axial hub extension of second sprocket 114. Inner ring, hereinafter referred to as slipper ring 118, is a split ring having an actuation slot 125 defining a pair of first and second upstanding lugs 126 and 128, respectively. A series of axially-extending arcuate cam tracks 130 are continuously formed in an outer surface of slipper ring 118 while a corresponding plurality of axially-extending arcuate cam tracks 132 are continuously formed in an inner surface of outer ring 124. A like plurality of elongated cylindrical rollers 134 are retained within aligned cam tracks 130 and 132.

Figure 3A:
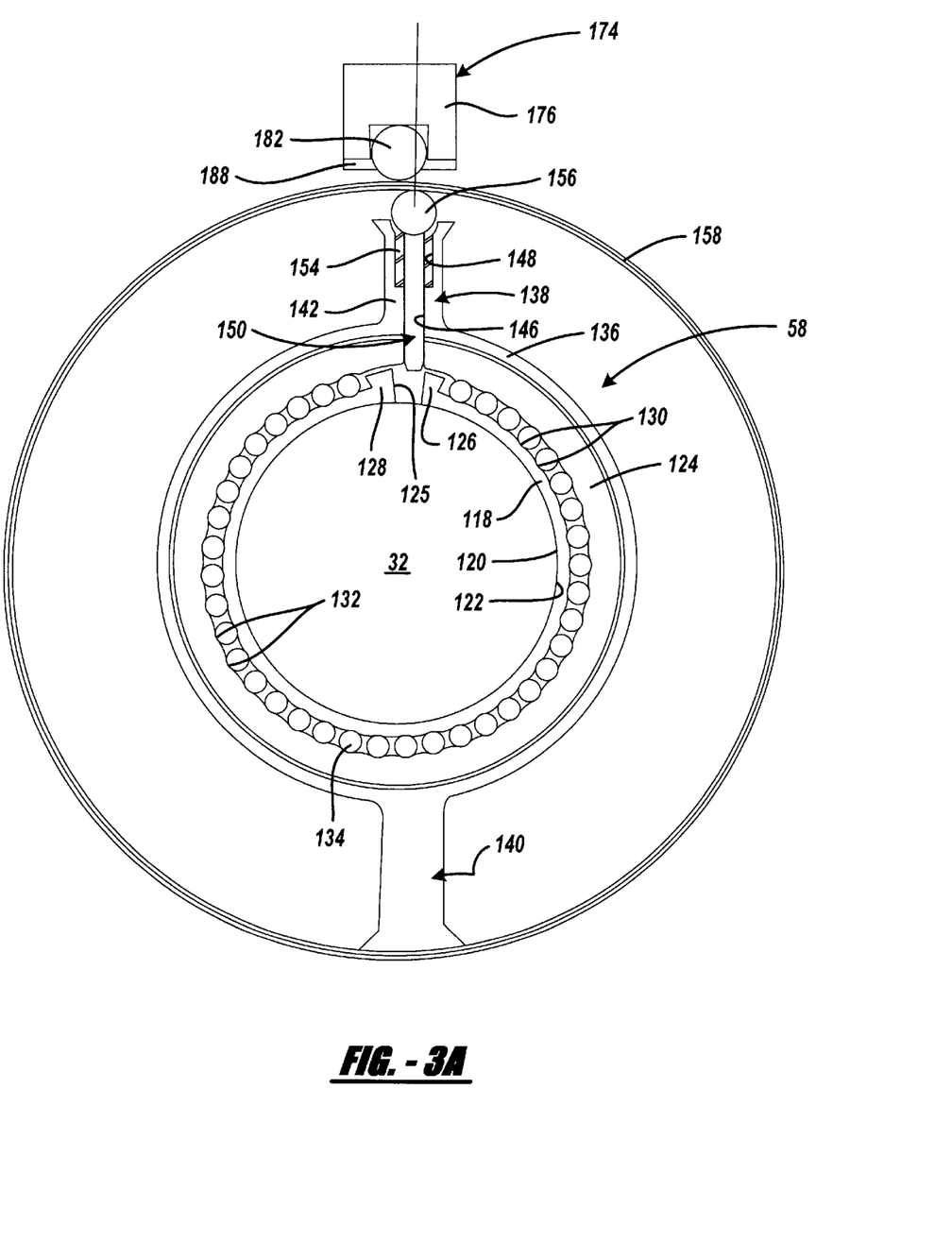
FIGS. 3A and 3B are sectional views of the bi-directional clutch assembly shown in FIG. 2.

Clutch assembly 58 also includes an actuator ring 136 that is fixed for rotation with outer ring 124 and which defines at least a pair of radial flanges 138 and 140. Flange 138 includes a first pin holder 142 and a second pin holder 144. First pin holder 142 defines a pin chamber 146 and a spring chamber 148 within which a first elongated actuator pin 150 is retained. As best seen from FIG. 3A, first actuator pin 150 has a stem section 152 extending through pin chamber 146 such that its terminal end is located in close proximity to first lug 126 of slipper ring 118. A biasing spring 154 surrounds stem section 152 and is retained in spring chamber 148 so as to act on a spherical head section 156 of first actuator pin 150. Spring 154 functions to normally bias first actuator pin 150 in a radially outward direction to a "released" position (as shown) relative to slipper ring 118 such that its terminal end is disengaged from contact with first lug 126 of slipper ring 118. However, first actuator pin 150 is moveable from its released position in a radially inward direction, in opposition to the biasing of spring 154, to an "engaged" position whereat the terminal end of its stem section 152 contacts first lug 126 of slipper ring 118. A first resilient band 158 is supported on radial flanges 138 and 140 and functions to limit outward radial movement of first actuator pin 150 beyond its released position.

Figure 3B:
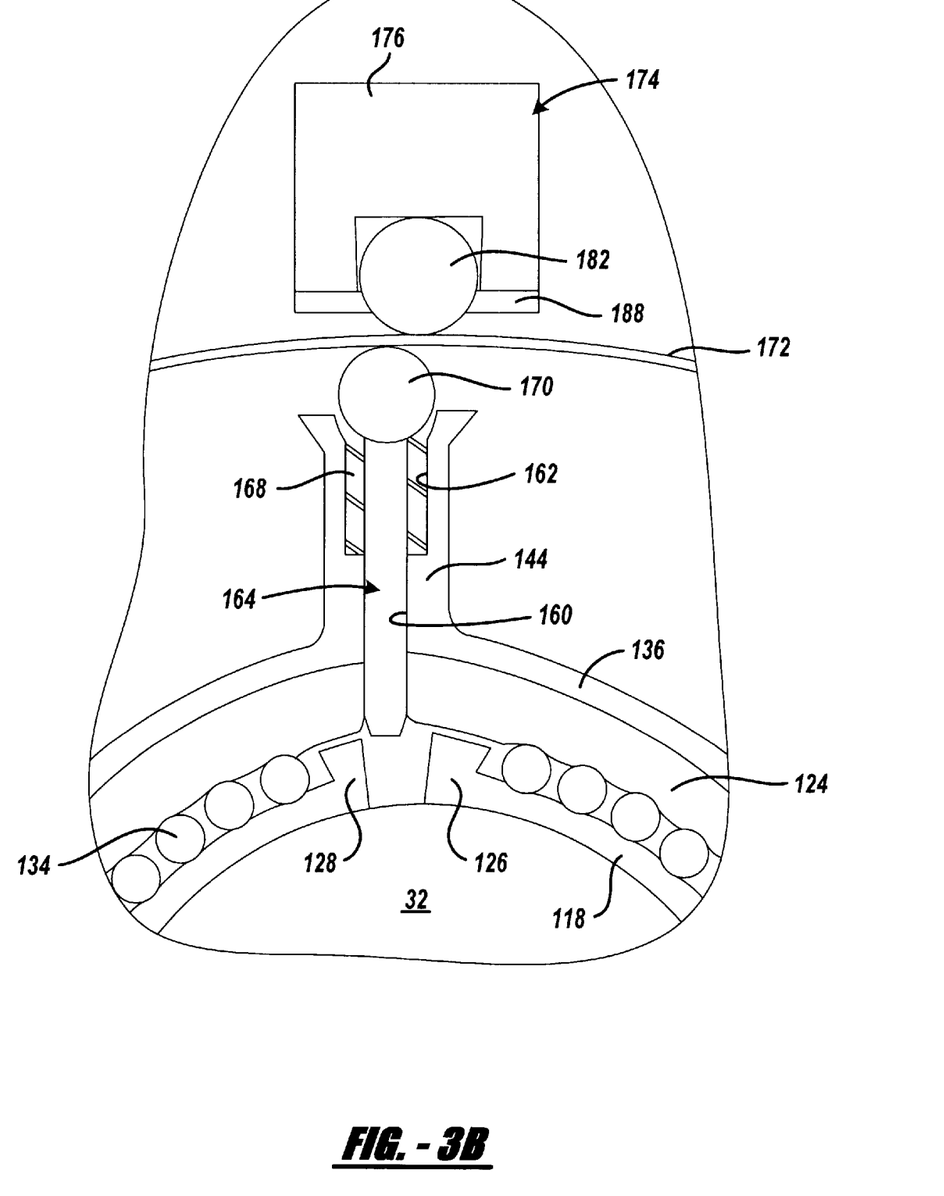

In a similar arrangement, second pin holder 144 defines a pin chamber 160 and a spring chamber 162 within which a second elongated actuator pin 164 is retained. However, second pin holder 144 is radially offset from first pin holder 142. As best seen from FIG. 3B, second actuator pin 164 has a stem section 166 extending through pin chamber 160 such that its terminal end is located in close proximity to second lug 128 of slipper ring 118. A biasing spring 168 surrounds stem section 166 and is retained in spring chamber 162 so as to act on a spherical head section 170 of second actuator pin 164. Spring 168 biases second actuator pin 164 in a radially outward direction to a "released" position (as shown) whereat its terminal end is disengaged from contact with second lug 128 of slipper ting 118. Second actuator pin 164 is moveable, in opposition to the biasing of spring 168, from its released position to an "engaged" position whereat the terminal end of stem section 166 engages second lug 128 of slipper ring 118. A second resilient band 172 is likewise supported on flanges 138 and 140 of actuator ring 136 and acts to limit radial outward movement of second actuator pin 164 beyond its released position.

To provide means for coordinating movement of actuator pins 150 and 164 between their respective released and engaged positions, shift system 60 further includes a mode fork 170 that is supported for axial translation on shift rail 98. In particular, mode fork 170 includes a radial plate segment 172 from which a flange segment 174 and an axial actuator segment 176 extend. One end of plate segment 172 is journalled on shift rail 98 while flange segment 174 is shown to have a follower pin 178 fixed thereto. Follower pin 178 is retained in a contoured mode slot 180 formed in sector plate 86. The contour of mode slot 180 is configured to axially translate mode fork 170 in response to rotation of sector plate 86 about the "A" axis. Furthermore, the contour of mode slot 180 works in concert with the contour of range slot 92 to coordinate movement of both mode fork 170 and range fork 76 so as to permit establishment of a plurality of distinct operational modes and speed ranges.

Figure 4:
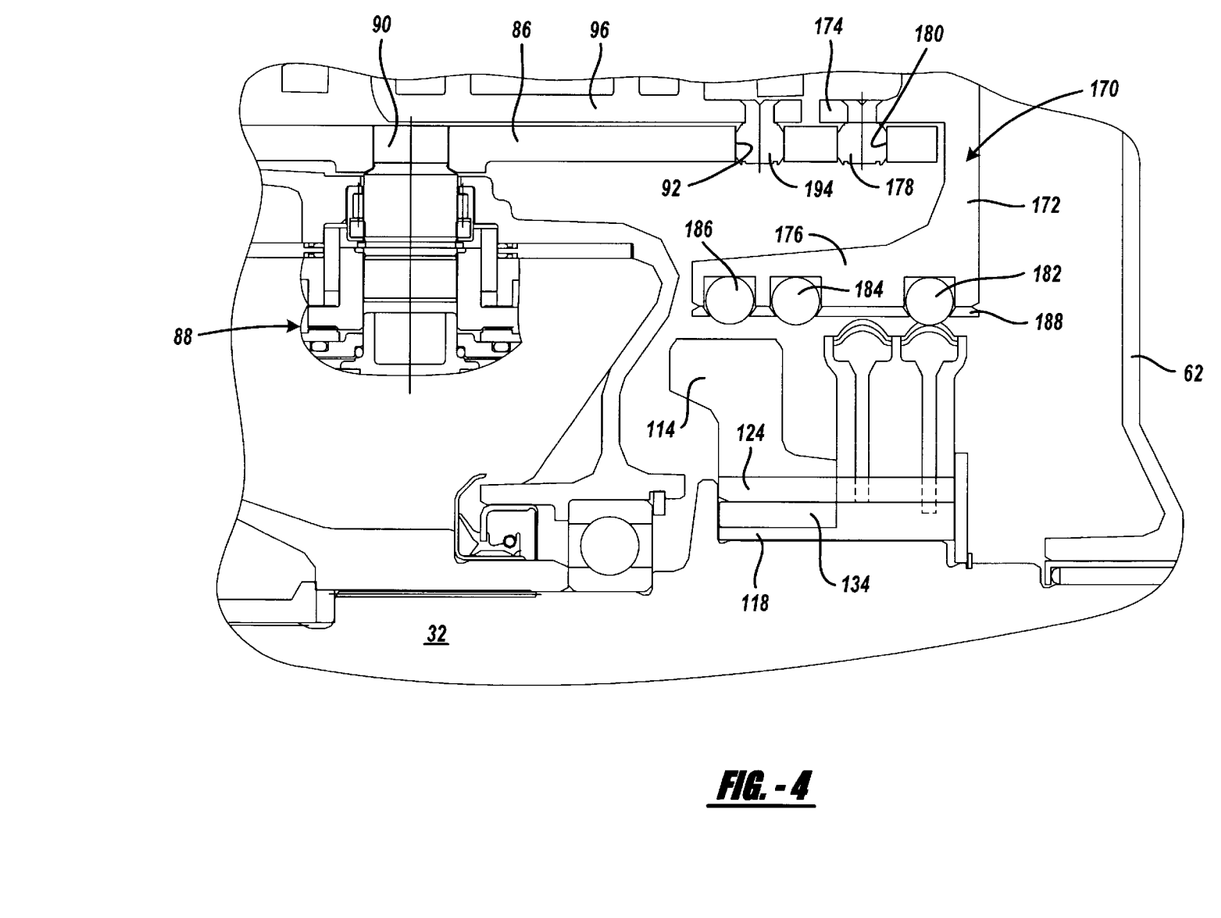
FIG. 4 is an enlarged partial view taken from FIG. 2 showing the mode actuator in a first position for establishing an on-demand drive mode during forward travel of the vehicle.
Figure 5:
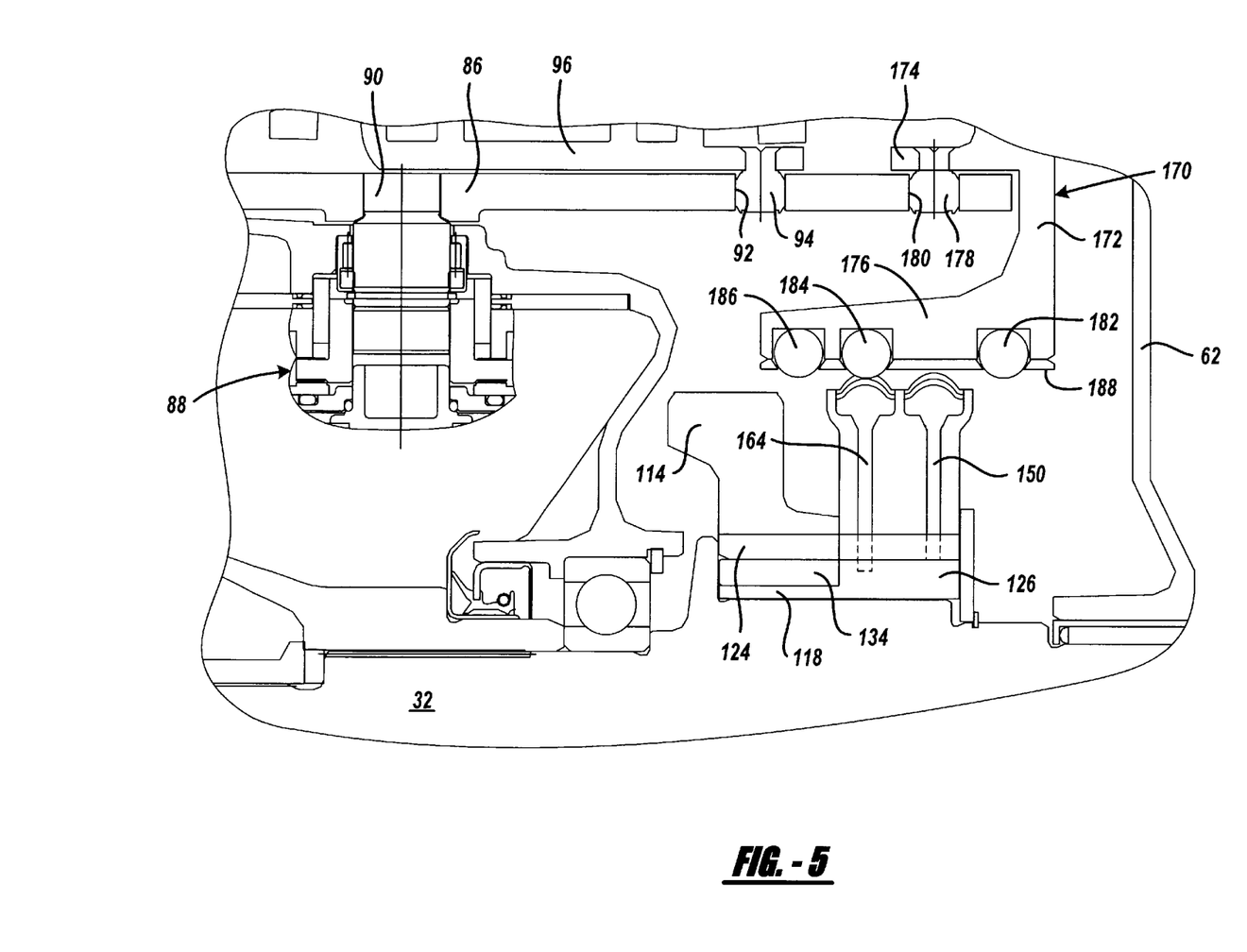
FIG. 5 is similar to FIG. 4 but with the mode actuator in a second position for establishing an on-demand drive mode during reverse travel of the vehicle.

Referring now primarily to FIGS. 4 through 7, a plurality of three actuator balls 182, 184 and 186 are shown to be retained by an apertured retainer plate 188 in corresponding chambers formed in actuator segment 176 of mode fork 170. The actuator balls are spaced along the length of actuator segment 176 to cause one or both of actuator pins 150 and 164 to move between their respective released and engaged position in response to axial movement of mode fork 170. For example, FIG. 4 illustrates mode fork 170 in a first mode position whereat first actuator pin 150 is held in its engaged position by first ball 182 while second pin 164 is located between balls 182 and 184 and biased by spring 168 to its released position. With mode fork 170 in its first mode position, the terminal end of stem segment 152 of first actuator pin 150 is in close proximity to or engages first lug 126 of slipper ring 118 so as to inhibit relative rotation between slipper ring 118 and outer ring 124 in a first direction while permitting limited relative rotation in a second direction. Concurrently, the terminal end of stem segment 166 of second actuator pin 164 is displaced from engagement with second lug 128 of slipper ring 118. Accordingly, clutch assembly 58 will free-wheel in response to rotation in one direction while automatically lock in response to rotation in the opposite direction. In this manner, an on-demand four-wheel drive mode is established during forward motive driving of the vehicle which permits front output shaft 32 to overrun rear output shaft 18 to accommodate typical steering maneuvers. However, if traction is lost at rear wheels 26, rear output shaft 18 attempts to overrun first output shaft 32 and limited relative rotation occurs between slipper ring 118 and outer ring 124. This limited relative rotation causes rollers 134 to ride up cam surfaces 130 and 132 which acts to frictionally clamp slipper ring 118 for rotation with front output shaft 32, thereby transferring drive torque from rear output shaft 18 through transfer assembly 56 and clutch assembly 58 to front output shaft 32. In this manner, clutch assembly 58 functions to automatically couple front output shaft 32 for rotation with rear output shaft 18.

Movement of mode fork 170 from its first mode position to a second mode position (shown in FIG. 5) acts to release first actuator pin 150 from engagement with first ball 182 and further causes second ball 184 to hold second actuator pin 164 in its engaged position. With mode fork 170 in its second mode position, the terminal end of first actuator pin 150 is displaced from first lug 126 of slipper ring 118 while the terminal end of second actuator pin 164 engages second lug 128 of slipper ring 118. This arrangement is the reverse of that shown and described above for the first mode position such that limited relative rotation is permitted between slipper ring 118 and outer ring 124 in the first direction while such relative rotation is inhibited in the second direction. Thus, an on-demand four-wheel drive mode is established during reverse motive driving of the vehicle. This on-demand mode also permits front output shaft 32 to overrun rear output shaft 18 during tight cornering while clutch assembly 58 locks to transfer drive torque to front output shaft 32 during lost traction at the rear wheels. Mode fork 170 is moved between its first and second mode positions by controlled rotation of sector plate 86 via actuation of motor assembly 88 based on a transmission signal from transmission 14 that is sent to controller 48 indicating whether transmission 14 is operating in a forward or reverse mode. Thus, if the mode selector 52 indicates selection of the on-demand (AUTO) mode by the vehicle operator, motor assembly 88 rotates sector plate 86 to locate mode fork 170 in its first mode position when transmission is shifted into a forward gear and to locate mode fork 170 in its second mode position when transmission is shifted into a reverse gear.

Figure 6:
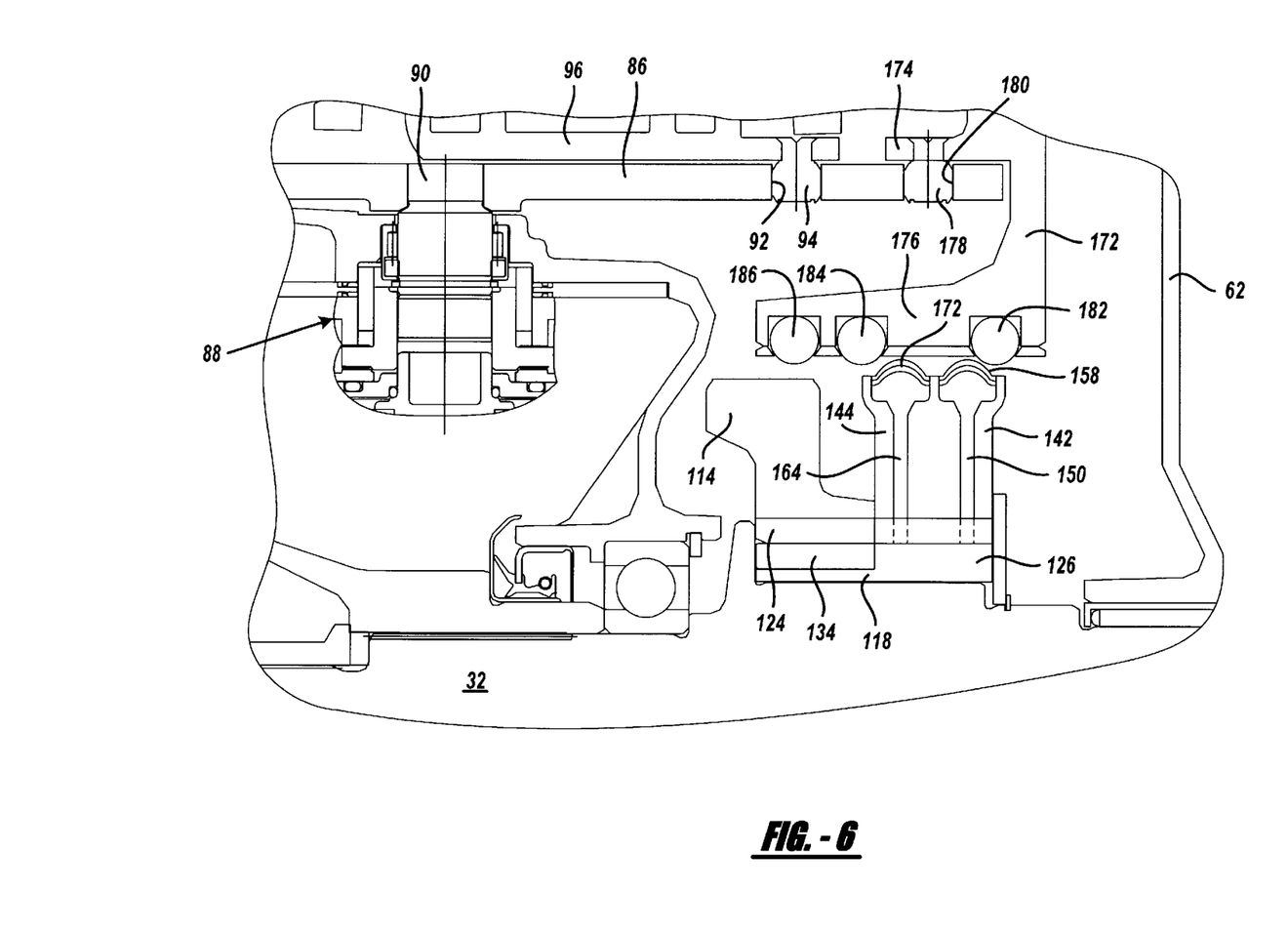
FIG. 6 is also similar to FIG. 4 but shows the mode actuator in a third position for establishing a locked four-wheel drive mode.

Referring now to FIG. 6, mode fork 170 is shown in a third mode position whereat both actuator pins 150 and 164 are disengaged from the balls 182 and 184 and are biased to their released positions. With pins 150 and 164 both released, limited relative rotation between slipper ring 118 and outer ring 124 is permitted in both directions, thereby causing automatic locking of clutch assembly 58 in both directions. Thus, a locked or part-time high-range four-wheel drive mode is established with second sprocket 114 clutched to front output shaft 32 regardless of the travel direction of the motor vehicle.

Figure 7:
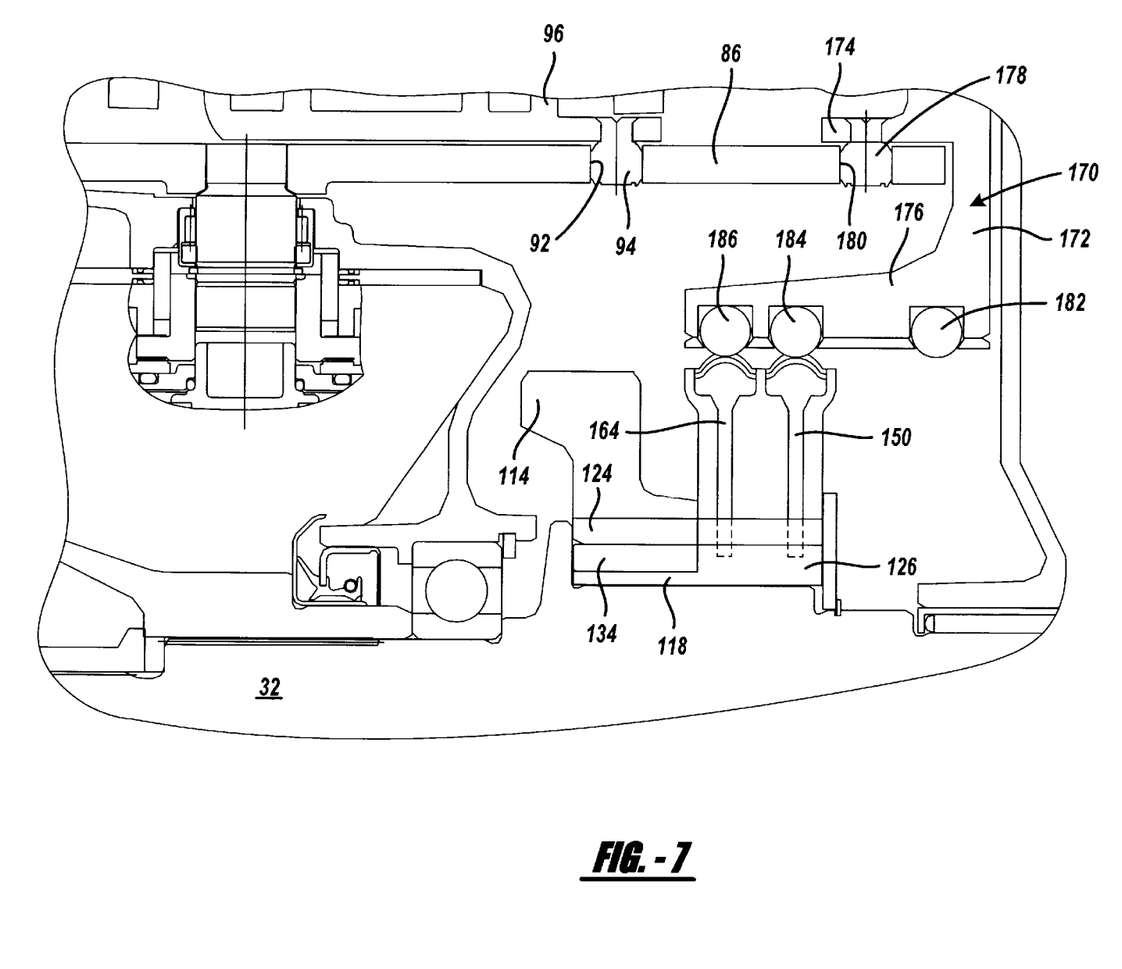
FIG. 7 is also similar to FIG. 4 but the mode actuator is shown in a fourth position for establishing a released or two-wheel drive mode.

FIG. 7 illustrates mode fork 170 in a fourth mode position whereat actuator pins 150 and 164 are respectively engaged by balls 136 and 138 for locating both pins in their engaged position. As such, slipper ring 118 is prevented from rotating relative to outer ring 124 in both directions and clutch assembly 58 is maintained in an unlocked condition for permitting bi-directional free-wheeling. With mode fork 170 in its fourth mode position, a two-wheel high-range drive mode is established such that no drive torque is transferred to front output shaft 32.

As will be appreciated, the various on-demand, part-time four-wheel drive and two-wheel drive modes were all disclosed as being established with range clutch 72 in its H position. However, similar modes can be established, if desired, with range clutch 72 in its L position due to the coordinated movement of range fork 76 and mode fork 170 caused by their respective contoured slots in sector plate 86. Typically, however, mode selector 52 will permit the vehicle operator to select from an On-Demand High-Range mode (AUTO) a Part-Time High-Range drive mode (4WH), a Two-Wheel High-Range drive mode (2WH), and a Part-Time Low-Range drive mode (4WL). If desired, an On-Demand Low-Range drive mode (AUTO-L) could be provided. If the 2WH mode is selected, disconnect clutch 46 is actuated to disconnect front propshaft 44 and first output shaft 32 from front differential 38 such that non-driven rotation of front driveline 34 due to rolling of wheels 40 is not transferred to propshaft 44.

A preferred embodiment of the invention has been disclosed to provide those skilled in the art an understanding of the best mode currently contemplated for the operation and construction of the transfer case. The invention being thus described, it will be obvious that various modifications can be made without departing from the true spirit and scope of the invention, and all such modifications as would be considered by those skilled in the art are intended to be included within the scope of the following claims.

What is claimed is:

1. A transfer case for use in a motor vehicle having a powertrain and first and second drivelines, comprising:

a first output shaft adapted to transfer drive torque from the powertrain to the first driveline;

a second output shaft adapted for connection to the second driveline;

a clutch assembly including a first ring journalled on said second output shaft and defining a split actuation slot having first and second end segments, a second ring driven by said first output shaft, a plurality of locking elements disposed in cam tracks formed in said first and second rings, a first pin moveable between positions engaged with and released from said first end segment of said first ring, and a second pin moveable between positions engaged with and released from said second end segment of said first ring; and a clutch actuator for controlling movement of said first and second pins, said clutch actuator moveable linearly relative to said first and second pins via actuation of a power-operated mover and having three actuating protrusions that can be selectively aligned with said first and second pins to provide at least four drive modes.

2. The transfer case according to claim 1 further comprising a transfer assembly for transferring drive torque from said first output shaft to said second ring of said clutch assembly.

3. The transfer case according to claim 1 wherein said clutch actuator is operable in a first position to locate said first pin in its engaged position and said second pin in its released position to establish a first on-demand drive mode wherein said clutch assembly is released to permit said second output shaft to overrun said first output shaft and said clutch assembly locks to prevent said first output shaft from overrunning said second output shaft.

4. The transfer case according to claim 3 wherein said clutch actuator is operable in a second position to locate said first pin in its released position and said second pin in its engaged position to establish a second on-demand drive mode wherein said clutch assembly locks to prevent said second output shaft from overrunning said first output shaft and said clutch assembly is released to permit said first output shaft to overrun said second output shaft.

5. The transfer case according to claim 4 wherein said clutch actuator is operable in a third position to locate said first and second pins in their released positions to establish a locked four-wheel drive mode wherein said clutch assembly is locked to prevent overrunning of said first output shaft relative to said second output shaft and prevent overrunning of said second output shaft relative to said first output shaft.

6. The transfer case according to claim 5 wherein said clutch actuator is operable in a fourth position to locate said first and second pins in their engaged positions to establish a two-wheel drive mode wherein said clutch assembly is released to allow overrunning of said first output shaft relative to said second output shaft and allow overrunning of said second output shaft relative to said first output shaft.

7. A transfer case for use in a motor vehicle having a powertrain and first and second drivelines, comprising:

a first output shaft adapted to transfer drive torque from the powertrain to the first driveline;

a second output shaft adapted for connection to the second driveline;

a clutch assembly including a first ring journalled on said second output shaft and defining a split actuation slot having first and second end segments, a second ring driven by said first output shaft, a plurality of locking elements disposed in cam tracks formed in said first and second rings, a first pin moveable between positions engaged with and released from said first end segment of said first ring, and a second pin moveable between positions engaged with and released from said second end segment of said first ring;

a resilient wrap disposed on said second ring for retaining said first and second pins when released from said first and second end segments of said first ring; and a clutch actuator for controlling movement of said first and second pins.

8. The transfer case according to claim 7 wherein said clutch actuator is operable in a first position to locate said first pin in its engaged position and said second pin in its released position to establish a first on-demand drive mode wherein said clutch assembly is released to permit said second output shaft to overrun said first output shaft and said clutch assembly locks to prevent said first output shaft from overrunning said second output shaft.

9. The transfer case according to claim 8 wherein said clutch actuator is operable in a second position to locate said first pin in its released position and said second pin in its engaged position to establish a second on-demand drive mode wherein said clutch assembly locks to prevent said second output shaft from overrunning said first output shaft and said clutch assembly is released to permit said first output shaft to overrun said second output shaft.

10. The transfer case according to claim 9 wherein said clutch actuator is operable in a third position to locate said first and second pins in their released positions to establish a locked four-wheel drive mode wherein said clutch assembly is locked to prevent overrunning of said first output shaft relative to said second output shaft and prevent overrunning of said second output shaft relative to said first output shaft.

11. The transfer case according to claim 10 wherein said clutch actuator is operable in a fourth position to locate said first and second pins in their engaged positions to establish a two-wheel drive mode wherein said clutch assembly is released to allow overrunning of said first output shaft relative to said second output shaft and allow overrunning of said second output shaft relative to said first output shaft.

12. A transfer case for use in a motor vehicle having a powertrain and first and second drivelines, comprising:

a first output shaft adapted to transfer drive torque from the powertrain to the first driveline;

a second output shaft adapted for connection to the second driveline;

a clutch assembly including a first ring journalled on said second output shaft and defining a split actuation slot having first and second end segments, a second ring driven by said first output shaft, a plurality of locking elements disposed in cam tracks formed in said first and second rings, a first pin moveable between positions engaged with and released from said first end segment of said first ring, and a second pin moveable between positions engaged with and released from said second end segment of said first ring;

a clutch actuator linearly moveable for controlling movement of said first and second pins;

a motor assembly having a rotational output for driving said clutch actuator; and a means for converting said rotational output of said motor assembly into linear movement of said clutch actuator.

13. The transfer case according to claim 12 wherein said means for converting said rotational output of said motor assembly into linear movement of said clutch actuator includes a plate rotationally fixed to said rotational output of said motor assembly, said plate having a slot, said clutch actuator connected to said plate by a pin through said slot, said slot having a shape such that rotation of said plate by said motor assembly linearly moves said clutch actuator.

14. The transfer case according to claim 12 wherein said clutch actuator is operable in a first position to locate said first pin in its engaged position and said second pin in its released position to establish a first on-demand drive mode wherein said clutch assembly is released to permit said second output shaft to overrun said first output shaft and said clutch assembly locks to prevent said first output shaft from overrunning said second output shaft.

15. The transfer case according to claim 14 wherein said clutch actuator is operable in a second position to locate said first pin in its released position and said second pin in its engaged position to establish a second on-demand drive mode wherein said clutch assembly locks to prevent said second output shaft from overrunning said first output shaft and said clutch assembly is released to permit said first output shaft to overrun said second output shaft.

16. The transfer case according to claim 15 wherein said clutch actuator is operable in a third position to locate said first and second pins in their released positions to establish a locked four-wheel drive mode wherein said clutch assembly is locked to prevent overrunning of said first output shaft relative to said second output shaft and prevent overrunning of said second output shaft relative to said first output shaft.

17. The transfer case according to claim 16 wherein said clutch actuator is operable in a fourth position to locate said first and second pins in their engaged positions to establish a two-wheel drive mode wherein said clutch assembly is released to allow overrunning of said first output shaft relative to said second output shaft and allow overrunning of said second output shaft relative to said first output shaft.

* * * * *